US011593165B2

(12) United States Patent
Pavlin et al.

(10) Patent No.: US 11,593,165 B2
(45) Date of Patent: Feb. 28, 2023

(54) RESOURCE-USAGE NOTIFICATION FRAMEWORK IN A DISTRIBUTED COMPUTING ENVIRONMENT

(71) Applicant: RED HAT, INC., Raleigh, NC (US)

(72) Inventors: Vaclav Pavlin, Brno (CZ); Michal Sekletar, Brno (CZ); Fridolin Pokorny, Modry Kamen (SK)

(73) Assignee: RED HAT, INC., Raleigh, NC (US)

( * ) Notice: Subject to any disclaimer, the term of this patent is extended or adjusted under 35 U.S.C. 154(b) by 274 days.

(21) Appl. No.: 16/909,583

(22) Filed: Jun. 23, 2020

(65) Prior Publication Data

US 2021/0397478 A1 Dec. 23, 2021

(51) Int. Cl.
*G06F 9/50* (2006.01)
*G06F 11/34* (2006.01)
*G06F 9/54* (2006.01)

(52) U.S. Cl.
CPC ............ *G06F 9/50* (2013.01); *G06F 11/3433* (2013.01); *G06F 9/54* (2013.01); *G06F 9/542* (2013.01); *G06F 2201/865* (2013.01)

(58) Field of Classification Search
None
See application file for complete search history.

(56) References Cited

U.S. PATENT DOCUMENTS

| 8,719,415 | B1 * | 5/2014 | Sirota | H04L 67/10 |
| | | | | 709/221 |
| 9,003,019 | B1 | 4/2015 | Guo | |
| 9,529,613 | B2 | 12/2016 | Muller et al. | |
| 2005/0065992 | A1 * | 3/2005 | Creamer | G06F 9/505 |
| | | | | 709/200 |
| 2017/0249574 | A1 | 8/2017 | Knijnik et al. | |
| 2018/0205593 | A1 * | 7/2018 | Livschitz | G06F 9/5077 |
| 2019/0155512 | A1 | 5/2019 | Tenner et al. | |

OTHER PUBLICATIONS

Jennings, B., et al., "Resource Management in Clouds: Survey and Research Challenges," TSSG, Waterford Institute of Technology, Ireland; ACCESS Linnæus Center, KTH Royal Institute of Technology, Sweden, 2013, http://brendanjennings.net/papers/2013_JNSM_bjennings_rstadler_preprint.pdf.

(Continued)

*Primary Examiner* — Qing Yuan Wu
(74) *Attorney, Agent, or Firm* — Kilpatrick Townsend & Stockton LLP

(57) ABSTRACT

A resource-usage notification framework can be implemented for distributed computing environments. For example, a system can determine the resource usage of a software application in a distributed computing environment. The system can determine if the resource usage is within a predefined range of a predefined resource-consumption limit. If so, the system can generate an event notification and transmit the event notification to the software application. The software application can receive the event notification and perform a mitigation operation in response. The mitigation operation can be configured to prevent the resource usage from exceeding the predefined resource-consumption limit or to mitigate an impact of the resource usage exceeding the predefined resource-consumption limit.

19 Claims, 3 Drawing Sheets

(56) References Cited

OTHER PUBLICATIONS

Singh, S., et al., "STAR: SLA-Aware Autonomic Management of Cloud Resources," Fellow, IEEE, 2017, http://www.buyya.com/papers/STAR-Cloud-TCC.pdf.

Singh, S., et al., "Resource Provisioning Based Scheduling Framework for Execution of Heterogeneous and Clustered Workloads in Clouds: from Fundamental to Autonomic Offering," Cloud Computing and Distributed Systems (CLOUDS) Laboratory, School of Computing and Information Systems, The University of Melbourne, Australia, Jan. 19, 2018, http://cloudbus.cis.unimelb.edu.au/~raj/papers/RPSchedCloud-JoGrid.pdf.

\* cited by examiner

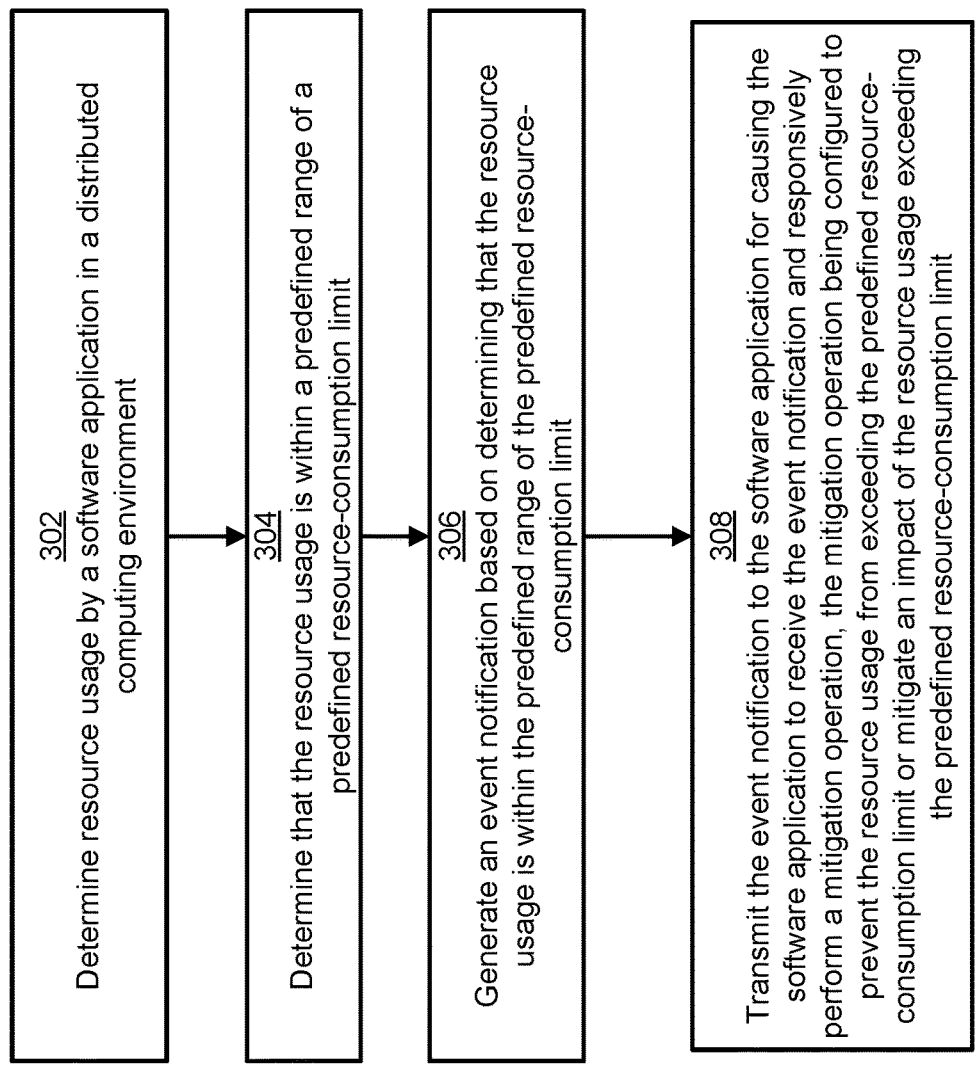

RESOURCE-USAGE NOTIFICATION FRAMEWORK IN A DISTRIBUTED COMPUTING ENVIRONMENT

TECHNICAL FIELD

The present disclosure relates generally to resource usage in distributed computing systems. More specifically, but not by way of limitation, this disclosure relates to a resource-usage notification framework in a distributed computing environment.

BACKGROUND

There are various types of distributed computing systems, such as grid computing systems, computing clusters, and cloud computing systems. Among these, computing clusters and cloud computing environments have become increasingly popular.

A computing cluster (cluster) is a group of nodes that can work together like a single system to combine computing power. Each node in the cluster may be running the same operating system and have other commonalities. A cluster can assign the same computing task to every node, or can assign different computing tasks to different nodes.

Cloud computing systems have a shared pool of computing resources (e.g., servers, storage, and virtual machines) that are used to provide services to users on demand. These services are generally provided according to a variety of service models, such as Infrastructure as a Service (Iaas), Platform as a Service (PaaS), or Software as a Service (SaaS). But regardless of the service model, cloud providers manage the physical infrastructures of the cloud computing systems to relieve this burden from users, so that the users can focus on other tasks like deploying applications.

BRIEF DESCRIPTION OF THE DRAWINGS

FIG. 3 is a flow chart of an example of a process for implementing a resource-usage notification framework in a distributed computing environment according to some aspects.

DETAILED DESCRIPTION

Figure 1:
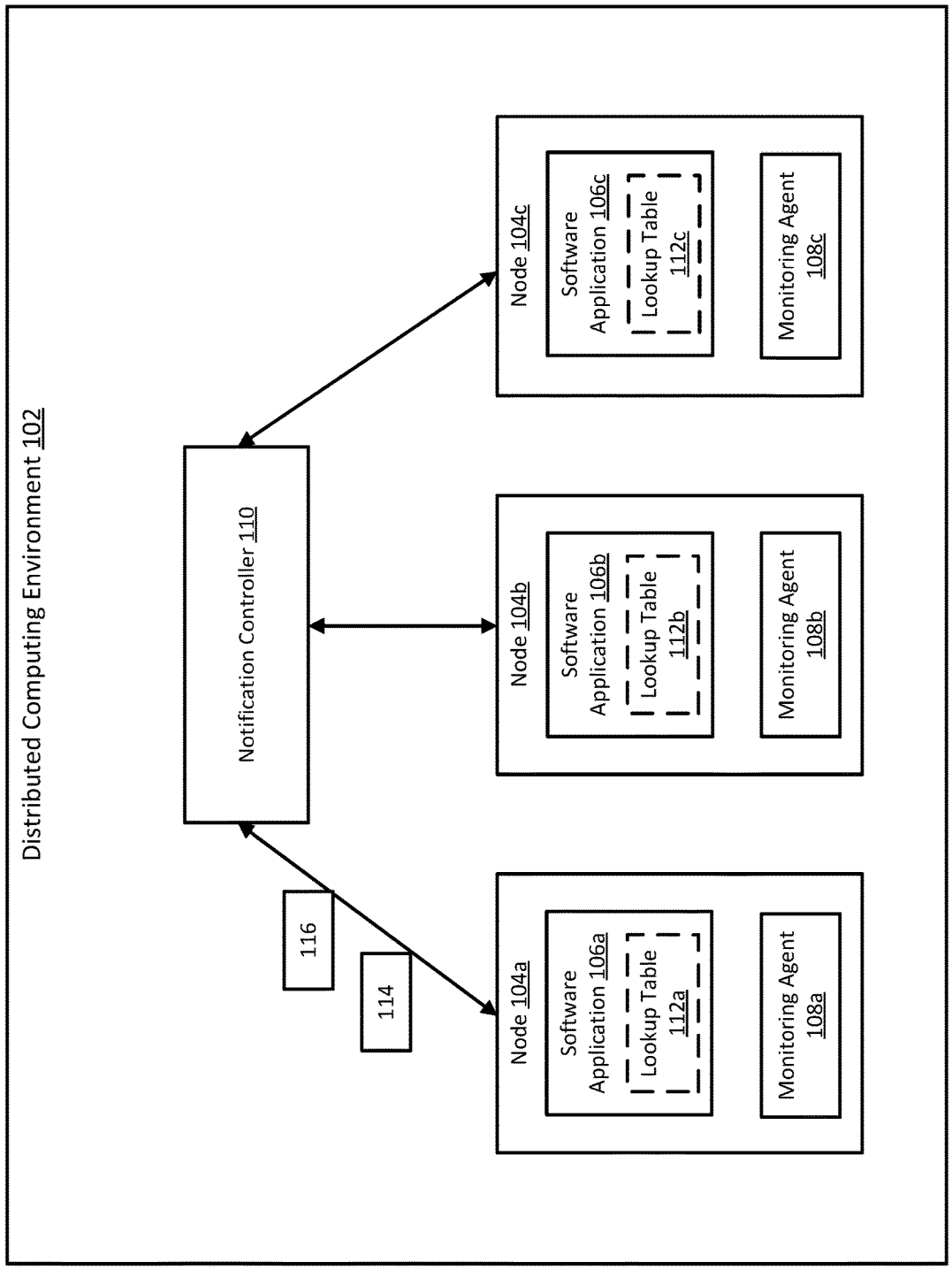
FIG. 1 is a block diagram of an example of a distributed computing environment for implementing a resource-usage notification framework according to some aspects.

There are various types of software applications, such as monolithic software applications and distributed software applications (e.g., software applications running on multiple nodes in a distributed computing system). Such software applications often use variable and unknown amounts of resources to perform tasks. Examples of such resource usage can include memory usage, disk usage, network usage, and processing-unit usage. If a software application overuses one or more resources, a cluster typically kills (e.g., terminates) the software application to preserve resources for other software applications running in the cluster. After a software application is killed, it may need to start over. In some cases, software applications may not save their data before they are killed, particularly if the software application is stateless. Rerunning such software applications, particularly when they are being used for big-data processing and machine learning, can be computationally expensive if they are killed in the middle of processing due to reaching resource limits.

Some examples of the present disclosure can overcome one or more of the abovementioned problems by notifying software applications that they are approaching a resource-usage limit so that the software applications can take corrective action, for example, to prevent the software application from being killed. In one example, a system can determine the resource usage of a software application in a distributed computing environment. The system can determine if the resource usage is within a predefined range of a predefined resource-consumption limit that can indicate the resource is overused. If so, the system can generate an event notification and transmit the event notification to the software application. The software application can receive the event notification and perform a mitigation operation in response. The mitigation operation can be configured to prevent the resource usage from exceeding the predefined resource-consumption limit or to mitigate an impact of the resource usage exceeding the predefined resource-consumption limit.

In one particular example, a software application can be a stateless application running on one or more nodes of a distributed computing environment (e.g. a cloud computing environment). A stateless application can be a software application that does not maintain data between sessions. The distributed computing environment can be configured to automatically stop or shutdown the software application in response to the software application's resource usage exceeding a predefined resource-consumption limit. To prevent this from happening, some examples can include a monitoring agent running on the one or more nodes associated with the software application. The monitoring agent can receive information about resource usage (e.g., memory usage, network usage, disk usage, or processing-unit usage) by the software application. The resource usage information could be received from an operating system kernel in one example. The monitoring agent can transmit the resource usage information to a notification controller running within the cluster. The notification controller can determine if the resource usage approaches the predefined resource-consumption limit and, if so, generate an event notification. The notification controller can then transmit the event notification to the software application. In response to receiving the event notification, the software application can perform a mitigation operation.

The mitigation operation can include one or more predefined operations configured to prevent the resource usage from exceeding the predefined resource-consumption limit or to mitigate an impact of the resource usage exceeding the predefined resource-consumption limit. In some examples, the software application can access a lookup table that specifies the mitigation operation for a given event notification.

As one particular example, the lookup table can specify that, for a given event notification, the intermediate results of a data-processing operation implemented by the software application are to be stored. Storing the intermediate results of the data-processing operation can enable the software application to pick up the data-processing operation from where it left off when the software application was killed, rather than starting the data-processing operation all over from the beginning. This can help to mitigate the impact of the software application being killed, as a result of the software application's resource usage exceeding the predefined resource-usage limit. As another example, the lookup table can specify that for a given event notification the software application is to be migrated to one or more different nodes having a higher resource-consumption limit than the node(s) on which the software application is currently executing. As still another example, the lookup table can specify that for a given event notification the software application is to kill one or more of its internal processes to reduce its resource usage.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a distributed computing environment 102 for implementing a resource-usage notification framework according to some aspects. The distributed computing environment 102 can include any number of nodes, such as servers or virtual machines. In this example, the distributed computing environment 102 includes nodes 104a-c.

At least some of the nodes 104a-c include software applications 106a-c and monitoring agents 108a-c. In this example, node 104a includes software application 106a and monitoring agent 108a, node 104b includes software application 106b and monitoring agent 108b, and node 104c includes software application 106c and monitoring agent 108c. The nodes 104a-c can communicate with a notification controller 110 about the respective resource usage of the respective software applications 106a-c and receive event notifications from the notification controller 110.

As one particular example, software application 106a can run on node 104a. The monitoring agent 108a can determine resource usage 114 for the software application 106a. Examples of the resource usage 114 can include memory usage, network usage, disk usage, central-processing unit usage, or any combination of these. The monitoring agent 108a can transmit the resource usage 114 to the notification controller 110. There can be a single instance or multiple instances of the notification controller 110 within the distributed computing environment 102. The notification controller 110 can be on the node 104a running the software application 106a or on a different node within the distributed computing environment 102. The notification controller 110 can process the resource usage 114 and determine if the resource usage 114 is within a predefined range of a predefined resource-consumption limit. For example, if the predefined resource-consumption limit is 2 GB of RAM, the notification controller 110 can determine whether the RAM usage of software application 106a is within 5% of the 2 GB limit (whether the software application 106a is consuming at least 1.9 GB of RAM). If the notification controller 110 determines that the resource usage 114 is within the predefined range of the predefined resource-consumption limit, the notification controller 110 can generate an event notification 116. The event notification 116 can indicate a high resource-consumption event in which the resource usage of a software application is approaching or has exceeded the predefined resource-consumption limit. In some examples, the event notification 116 may indicate a particular event type, whereby there may be many different event types associated with one or more resources approaching their limits. The notification controller 110 can then transmit the event notification 116 to the software application 106a of node 104a.

The software application 106a can receive the event notification 116 and responsively perform a mitigation operation. The mitigation operation can be configured to prevent the resource usage 114 from exceeding the predefined resource-consumption limit or mitigate an impact of the resource usage 114 exceeding the predefined resource-consumption limit.

In some examples, the software application 106a can determine the mitigation operation by accessing a lookup table 112a that specifies correlations between event notifications and mitigation operations. In this example, the lookup table 112a is within the software application 106a. In another example, the lookup table 112a can be external to the software application 106a and can be accessed by the software application 106a. The lookup table 112a can include predefined relationships between types of event notifications and types of mitigation operations. In one example, the lookup table 112a can correlate one type of event notification to a mitigation operation involving storing intermediate results of a data-processing operation implemented by the software application 106a. In another example, the lookup table 112a can correlate another type of event notification to a mitigation operation involving killing, throttling, or otherwise adjusting one or more processes of the software application 106a to reduce the resource consumption of the software application 106a. In still another example, the lookup table 112a can correlate another type of event notification 116 to a mitigation operation involving migrating the software application 106a from node 104a to another node in the distributed computing environment 102, such as node 104b. The other node may have a higher predefined resource-consumption limit or otherwise have more resources available.

Although in some examples the software application 106a can determine the mitigation operation, in other examples the notification controller 110 can determine the mitigation operation and transmit the mitigation operation to the software application 106a (e.g., as part of the event notification 116 or in another communication). In some such examples, the notification controller 110 can include or have access to the lookup table 112a for determining the mitigation operation.

While the above example is described in relation to software application 106a running on one node 104a for simplicity, such monitoring agents can be deployed on any number of nodes in the distributed computing environment 102 to monitor any number of software applications running on any number and combination of nodes. For example, the same process as above could be performed on node 104b running the software application 106b. Monitoring agent 108b can determine the resource usage and communicate the resource usage to the notification controller 110. The notification controller 110 can determine if the resource usage is in the predefined range of the predefined resource-consumption limit. If the resource usage is determined to be within the predefined range of the predefined resource-consumption limit, the notification controller 110 can send an event notification to the software application 106b on node 104b. The software application 106b can access the lookup table 112b to determine the mitigation operation for the event notification. Similar steps can be performed with respect to the software application 106c, monitoring agent 108c, the notification controller 110, and the lookup table 112c.

Figure 2:
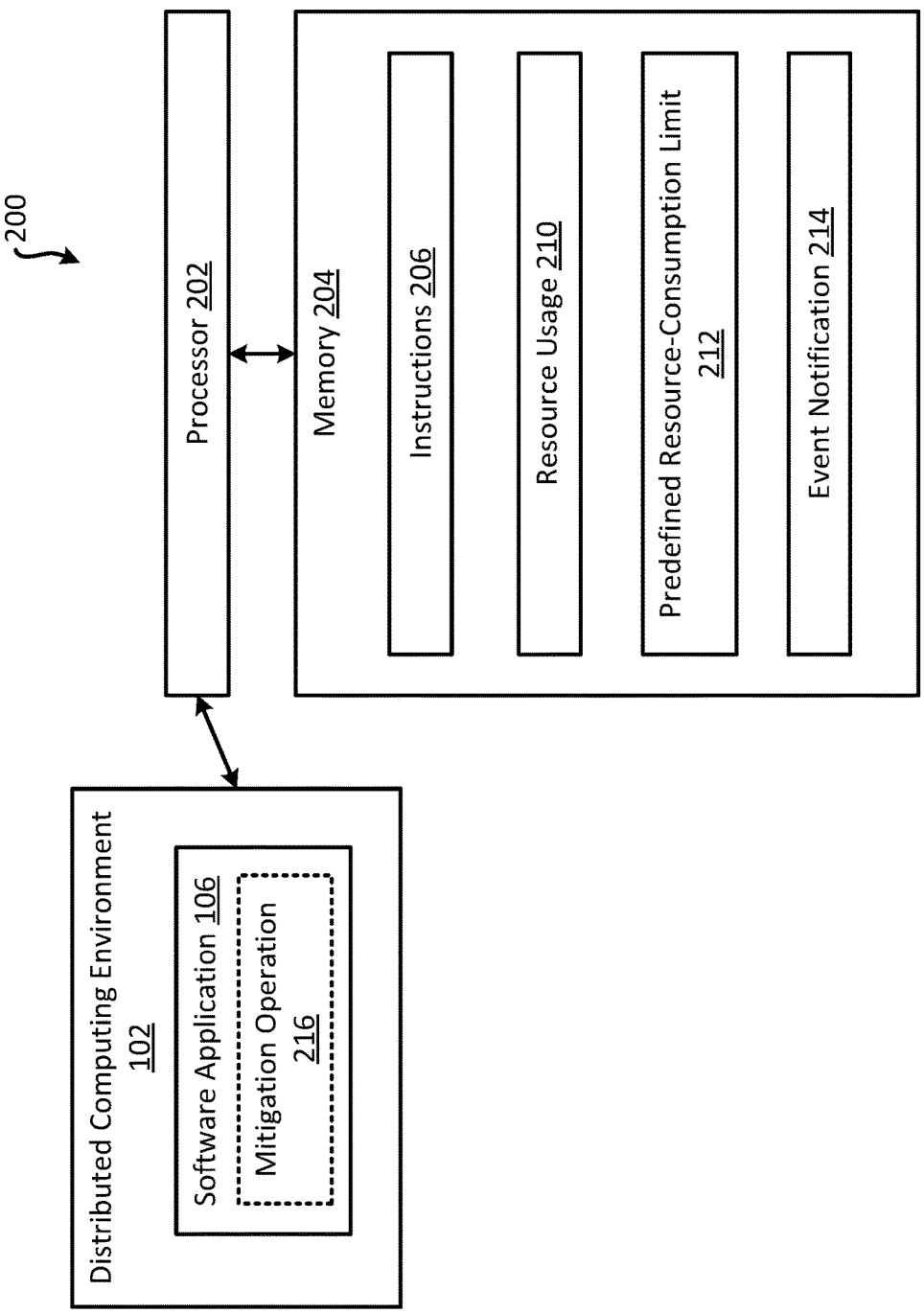
FIG. 2 is a block diagram of an example of a system for implementing a resource-usage notification framework according to some aspects.

FIG. 2 is a block diagram of an example of a system 200 for implementing a resource-usage notification framework in a distributed computing environment 102 according to some aspects. The system 200 includes a processor 202 communicatively coupled with a memory 204. In some examples, the processor 202 and the memory 204 can be parts of one or more nodes 104a-c of the distributed computing environment 102 of FIG. 1.

The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. In some examples, the instructions 206 can include processor-specific instructions generated by a compiler or an interpreter from code written in any suitable computer-programming language, such as C, C++, C#, etc.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. In some examples, at least some of the memory can include a medium from which the processor 202 can read instructions 206. A computer-readable medium can include electronic, optical, magnetic, or other storage devices capable of providing the processor 202 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 206.

In some examples, the processor 202 determines resource usage 210 by a software application 106 in a distributed computing environment 102. The processor 202 can determine that the resource usage 210 is within a predefined range of a predefined resource-consumption limit 212. Based on determining that the resource usage 210 is within the predefined range of the predefined resource-consumption limit 212, the processor 202 generates an event notification 214. The processor 202 can transmit (e.g., directly or indirectly) the event notification 214 to the software application 106 for causing the software application 106 to receive the event notification 214 and responsively perform a mitigation operation 216. The mitigation operation 216 can be configured to prevent the resource usage 210 from exceeding the predefined resource-consumption limit 212 or mitigate an impact of the resource usage 210 exceeding the predefined resource-consumption limit 212. For example, the mitigation operation 216 can involve storing intermediate results of a data-processing operation implemented by the software application 106, so as to mitigate an impact of the software application 106 being killed as a result of the software application's resource usage approaching or exceeding the predefined resource-consumption limit 212.

In some examples, the processor 202 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIG. 2.

In block 302, the processor 202 determines resource usage 210 by a software application 106 in a distributed computing environment 102. The resource usage 210 can include memory usage, disk usage, network usage, or processing-unit usage. The processor 202 can communicate with a monitoring agent to determine the resource usage 210.

In block 304, the processor 202 determines that the resource usage 210 is within a predefined range of a predefined resource-consumption limit 212. An administrator or operator of the distributed computing environment 102 may set the predefined resource-consumption limit, in some examples. If resource usage 210 is within the predefined range of the predefined resource-consumption limit 212, it can indicate a high resource-consumption event.

In block 306, the processor generates an event notification 214 based on determining that the resource usage 210 is within the predefined range of the predefined resource-consumption limit 212. The event notification 214 can indicate a type of the high resource-consumption event, such as a high memory-consumption event, a high disk-usage event, a high processing-usage event, a high network-usage event, or any combination of these. This may allow the software application 106 to perform one or more different types of mitigation operations depending on the one or more types of high resource-consumption events.

In block 308, the processor 202 transmits the event notification 214 to the software application 106 for causing the software application 106 to receive the event notification 214 and responsively perform a mitigation operation 216. In some examples, the mitigation operation 216 can be configured to prevent the resource usage 210 from exceeding the predefined resource-consumption limit 212. In other examples, the mitigation operation 216 can be configured to mitigate an impact of the resource usage 210 exceeding the predefined resource-consumption limit 212. The software application 106 can be configured to determine the mitigation operation 216 in response to the event notification 214 by accessing a lookup table that specifies correlations between event notifications and mitigation operations.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s) to yield further examples.

The invention claimed is:

1. A system comprising:
a processor; and
a memory including instructions that are executable by the processor for causing the processor to:
determine resource usage by a software application in a distributed computing environment;
determine that the resource usage is within a predefined range of a predefined resource-consumption limit;
generate an event notification based on determining that the resource usage is within the predefined range of the predefined resource-consumption limit; and
transmit the event notification to the software application, wherein the software application is configured to receive the event notification and responsively perform a mitigation operation that prevents the resource usage from exceeding the predefined resource-consumption limit or mitigates an impact of the resource usage exceeding the predefined resource-consumption limit, and wherein the software application is configured to determine the mitigation operation based on the event notification by accessing a predefined lookup table that maps at least two different types of event notifications to at least two different types of mitigation operations, wherein the predefined lookup table is specific to the software application.

2. The system of claim 1, wherein the resource usage includes memory usage, disk usage, network usage, or processing-unit usage.

3. The system of claim 1, wherein the event notification is configured to indicate a high resource-consumption event in which the resource usage for the software application is within the predefined range of the predefined resource-consumption limit or has surpassed the predefined resource-consumption limit.

4. The system of claim 1, wherein the software application is a stateless application and the distributed computing environment is a cloud computing environment.

5. The system of claim 4, wherein the distributed computing environment is configured to automatically execute one or more stop or shutdown operations that stop or shutdown the software application in response to the resource usage exceeding the predefined resource-consumption limit, the one or more stop or shutdown operations being different from the mitigation operation.

6. The system of claim 4, wherein the predefined lookup table maps at least one type of event notification to a mitigation operation that involves storing intermediate results of a data-processing operation implemented by the software application.

7. The system of claim 4, wherein the predefined lookup table is part of the software application.

8. A method comprising:
   determining, by a processor, resource usage by a software application in a distributed computing environment;
   determining, by the processor, that the resource usage is within a predefined range of a predefined resource-consumption limit;
   generating, by the processor, an event notification based on determining that the resource usage is within the predefined range of the predefined resource-consumption limit;
   transmitting, by the processor, the event notification to the software application; and
   performing, by the software application, a mitigation operation in response to receiving the event notification, wherein the mitigation operation prevents the resource usage from exceeding the predefined resource-consumption limit or mitigates an impact of the resource usage exceeding the predefined resource-consumption limit, and wherein the software application is configured to determine the mitigation operation based on the event notification by accessing a predefined lookup table that maps at least two different types of event notifications to at least two different types of mitigation operations, wherein the predefined lookup table is specific to the software application.

9. The method of claim 8, wherein the resource usage includes memory usage, disk usage, network usage, or processing-unit usage.

10. The method of claim 8, wherein the event notification is configured to indicate a high resource-consumption event in which the resource usage for the software application is within the predefined range of the predefined resource-consumption limit or has surpassed the predefined resource-consumption limit.

11. The method of claim 10, wherein the predefined lookup table is part of the software application.

12. The method of claim 8, wherein the software application is a stateless application and the distributed computing environment is a cloud computing environment.

13. The method of claim 8, wherein the distributed computing environment is configured to automatically execute one or more stop or shutdown operations that stop or shutdown the software application in response to the resource usage exceeding the predefined resource-consumption limit, the one or more stop or shutdown operations being different from the mitigation operation.

14. The method of claim 13, wherein the predefined lookup table correlates at least one type of event notification to a mitigation operation that is configured to prevent the one or more stop or shutdown operations from being executed by the distributed computing environment.

15. The method of claim 8, wherein the predefined lookup table maps at least one type of event notification to a mitigation operation that involves storing intermediate results of a data-processing operation implemented by the software application.

16. A non-transitory computer-readable medium comprising program code that is executable by a processor for causing the processor to:
   determine resource usage by a software application in a distributed computing environment;
   determine that the resource usage is within a predefined range of a predefined resource-consumption limit;
   generate an event notification based on determining that the resource usage is within the predefined range of the predefined resource-consumption limit; and
   transmit the event notification to the software application, wherein the software application is configured to receive the event notification and responsively perform a mitigation operation that prevents the resource usage from exceeding the predefined resource-consumption limit or mitigates an impact of the resource usage exceeding the predefined resource-consumption limit, and wherein the software application is configured to determine the mitigation operation based on the event notification by accessing a predefined lookup table that maps at least two different types of event notifications to at least two different types of mitigation operations, wherein the predefined lookup table is specific to the software application.

17. The non-transitory computer-readable medium of claim 16, wherein the resource usage includes memory usage, disk usage, network usage, or processing-unit usage.

18. The non-transitory computer-readable medium of claim 16, wherein the event notification is configured to indicate a high resource-consumption event in which the resource usage for the software application is within the predefined range of the predefined resource-consumption limit or has surpassed the predefined resource-consumption limit.

19. The non-transitory computer-readable medium of claim 16, wherein the software application is a stateless application and the distributed computing environment is a cloud computing environment.

* * * * *